Patented Nov. 27, 1951

2,576,820

UNITED STATES PATENT OFFICE 2,576,820

REVERSIBLE GEL COMPOSITION COMPRISING POLYVINYL ALCOHOL AND METHOD OF PREPARATION

Carl E. Barnes, Belvidere, N. J., and William O. Ney, Jr., Easton, Pa., assignors to General Aniline & Film Corporation, New York, N. Y., a corporation of Delaware No Drawing. Application November 3, 1944, Serial No. 561,827

8 Claims. (Cl. 260—8)

This invention relates to the preparation of thermal-reversible gels by gelling polyvinyl alcohols with water-soluble nitrogenous substances, such as water-soluble proteins and protein degradation products and alpha-amino acids. The invention also relates to the reversible gels so obtained.

The term "thermal-reversible gels" refers to such a gel as is converted to a liquid upon heating but again forms a gel upon cooling. We include such gels which, regardless of the number of times of heating and cooling, form a liquid and then gel each time.

By the term "polyvinyl alcohol," we refer to polymers composed of a preponderance of vinyl alcohol units. Not only do we include polymers which are entirely composed of vinyl alcohol units, but which also contain vinyl ester, vinyl ether and acetal units, such as vinyl acetate, propionate, butyrate, polyvinyl propionylaldehyde acetals, and polyvinyl butyraldehyde acetals which contain large proportions of hydroxyl groups. Any water-soluble polyvinyl alcohol can be converted into a thermal-reversible gel by our process.

Polyvinyl alcohol is usually soluble in water and does not possess the properties of gelling under ordinary conditions. An important practical disadvantage of polyvinyl alcohol, particularly as a substitute for gelatin, is the failure of its aqueous solutions to exhibit the phenomenon of thermal-reversible gelation. This property is of importance in the manufacture of photographic emulsions, since it makes possible the removal of soluble salts by washing in cold water and also permits coating of the emulsion on the support by simply heating the gel until it melts to a liquid. Where continued contact with water and aqueous solutions is involved, polyvinyl alcohol cannot be used, since it will be dissolved by the solutions. For this reason, various additions to polyvinyl alcohol have been proposed which are designed to impart the property of thermal-reversible gelation.

Thus, in Patent No. 2,234,186, o-hydroxybenzal aromatic ketones have been proposed as a gelation agent for polyvinyl alcohol. In Patent No, 2,249,536, it has been proposed to use unsubstituted hydroxy aromatic compounds, while in Patent No. 2,249,538 substituted hydroxy aromatic compounds are disclosed. Patent No. 2,249,537 discloses the employment of water-soluble salts of hydroxybenzoyl amides for this purpose.

Accordingly, one of the objects of our invention is to provide a substance possessing the property of thermal-reversible gelation in an aqueous solution which may be used as a substitute for gelatin.

Another object of our invention is to provide a polyvinyl alcohol composition which is capable of duplication and may be used as a substitute for gelatin in its various applications.

A still further object is to provide a polyvinyl alcohol gel which is capable of modification to give gels having a wider range of physical properties than is possible with gelatin.

We have discovered that when to aqueous solutions of polyvinyl alcohol there is added water-soluble proteins and protein degradation products, such as albumin, gelatin, and glue as well as certain alpha-amino acids and their condensation products, such as the diketopiperazines, there is imparted the property of thermal-reversible gelation to the polyvinyl alcohol. These gelling agents are effective in the gelation of polyvinyl alcohol, regardless of whether the polyvinyl alcohol is prepared from polyvinyl acetate or other polyvinyl compounds of high, medium, or low viscosity. The polyvinyl alcohol gel may be prepared in various ways. Thus, the gelling agent may be directly added to an aqueous solution of polyvinyl alcohol, or the polyvinyl alcohol and the gelling agent may be dissolved in hot water, or an aqueous solution of the gelling agent may be added to an aqueous solution of a polyvinyl alcohol. The solution thus formed is dried. On adding water to the dried material it swells to form a gel. This may be converted into a liquid for coating or impregnation by heating the gel to the melting temperature.

The following examples illustrate our invention:

*Example 1*

To 10 parts by weight of a 10% aqueous solution of a far-hydrolyzed polyvinyl acetate having a viscosity of 20 centipoises in 4% solution was added 1 part of glycine. This mixture was then heated to boiling for a few minutes and spread out to dry at a temperature ranging from about 20–60° C. The dried material, although insoluble in cold water, swells therein to form a tough gel which is thermal-reversible. Upon warming, the gel melts and may be coated on a glass or other support to form on drying, a clear colorless, tough film which is especially scratch-resistant.

*Example 2*

8.5 parts by weight of a far-hydrolyzed polyvinyl acetate of medium viscosity and 1.5 parts of gelatin were dissolved in 80 parts of hot water, and the solution spread out to dry at room temperature. The dried material, although insoluble in cold water, swells therein to form a tough gel which is thermal-reversible. This gel can be washed in cool water for long periods of time without dissolving. The washed gel is thermal-reversible and may be melted and cast to form a colorless, tough, scratch-resistant film on drying. The dried film is completely transparent and homogeneous. When over 20% gelatin was added to the hydrolyzed polyvinyl acetate, the resulting dry films are no longer transparent but resemble coarse ground glass in appearance.

*Example 3*

1 part by weight of bone glue was added to 9 parts of the 10% solution of polyvinyl alcohol described in Example 1. The mixture was heated for a few minutes until the glue was dissolved, and the solution spread out to dry at room temperature. Although insoluble in cold water, the dried material swells therein to form a tough gel which is thermal-reversible.

In general, only small amounts of the nitrogenous gelling agents are required to gel the polyvinyl alcohol. In fact, larger amounts are as a rule incompatible with the polyvinyl alcohol. While these incompatible mixtures might be useful for some purposes, especially when the added substance is dispersed in the polyvinyl alcohol solution, we prefer to utilize those compositions which are compatible and form transparent films on drying. In general, one need use only gelling amounts of the agents. The amount of gelling agent added may range from about 1 to about 20%, based on the weight of the polyvinyl alcohol, when it is desired to form transparent films on drying. Of course, where transparency is not a prerequisite of the film, the amount of gelling agent used may vary from above 20% to about 98%.

The exact physical properties of the gel obtained may be varied to some extent, not only by the nature and amount of the added nitrogenous substance, but also by varying the molecular weight, degree of hydrolysis, and nature of the other substituents of the polyvinyl alcohol employed. Thus, if, for example, a polyvinyl acetate of high molecular weight is hydrolyzed to yield a polyvinyl alcohol, as for example, according to the process of Patent No. 1,971,951, wherein the polyvinyl ester is hydrolyzed by use of hydrochloric acid, solutions containing this product will be more viscous than those of equal concentration containing a polyvinyl alcohol prepared from a lower molecular weight polyvinyl acetate. In this case, a smaller proportion of the gelation agent is used than in the case of a polyvinyl alcohol of lower molecular weight.

The degree of hydrolysis of the polyvinyl ester also contributes to the physical properties of the polyvinyl alcohol formed and is an important factor in determining the characteristics of the aqueous solutions and the gels obtained therefrom. Also a contributing factor of the gelling characteristics of the solution is the nature of the unhydrolyzed groups in the polyvinyl compound. If, for example, a polymer of vinyl formate is partially hydrolyzed to produce a polyvinyl alcohol, the properties of this product will differ from those of a similar product made from a polymer of vinyl acetate. The formyl groups have a greater tendency to exert attractive forces of the so-called "secondary valence" type on one another, and the tendency to gel and strength of the resulting gel is thereby increased due to the increase in cohesive properties caused by this secondary valence.

Other groups may be present in the polyvinyl alcohol polymer by employing for the hydrolysis an interpolymer of a vinyl ester with other vinyl compounds, such as nitriles, esters, amides, and similar derivates of acrylic and alpha-substituted acrylic acids, as well as the free acids themselves. The use of such substituted vinyl alcohols is intended to fall within the scope of our invention.

The water-soluble protein degradation products may be obtained by the processes described in Patents Nos. 1,719,711, 1,727,866 and 1,315,983, that is, either by alkaline or acid hydrolysis of various protein material.

Not only may the thermal-reversible gels prepared by our process be used as a substitute for gelatin in photographic emulsions, but they may serve many other purposes. Thus, in the form of sheeting, the transparent film when properly colored may be used as a safe light or for light filters in photographic equipment. The gels may likewise be used as subbing layers, overcoatings, or backings for film. Unlike gels described in the patents mentioned in the beginning of the specification, our gels when coated out in the form of a sheet or layer do not require any subsequent hardening treatment, since they form a tough film which is highly scratch-resistant and unaffected by repeated treatments with aqueous solutions. Our gelled polyvinyl alcohol has especial advantages over natural products, such as gelatin and the like. Unlike the latter, they can be obtained with a definite purity and standardized properties so that there is no variation in different batches. The gels may also be used for sizing and general coating purposes.

We claim:

1. A firm, transparent, thermo-reversible gel consisting of a water-soluble polyvinyl alcohol, water and from about 1 to about 20%, based on the weight of the polyvinyl alcohol, of a water-soluble nitrogeneous compound selected from the group consisting of water-soluble proteins and protein-degradation products, said gel being prepared by drying a solution in water of the aforesaid components, and swelling the dried product thus obtained, in cold water.

2. A firm, transparent, thermo-reversible gel consisting of a water-soluble polyvinyl alcohol, water and from about 1 to about 20%, based on the weight of the polyvinyl alcohol, of gelatin, said gel being prepared by drying a solution in water of the aforesaid components, and swelling the dried product thus obtained, in cold water.

3. A firm, transparent, thermo-reversible gel consisting of a water-soluble polyvinyl alcohol, water and from about 1 to about 20%, based on the weight of the polyvinyl alcohol, of bone glue, said gel being prepared by drying a solution in water of the aforesaid components, and swelling the dried product thus obtained, in cold water.

4. A firm, transparent, thermo-reversible gel consisting of a water-soluble polyvinyl alcohol, water and from about 1 to about 20%, based on the weight of the polyvinyl alcohol, of glycine, said gel being prepared by drying a solution in water of the aforesaid components, and swelling the dried product thus obtained, in cold water.

5. A method of preparing a firm, transparent, thermo-reversible gel, which comprises preparing a mixture consisting of an aqueous solution of a water-soluble polyvinyl alcohol and from about 1 to about 20%, based on the weight of the polyvinyl alcohol, of a water-soluble nitrogeneous compound selected from the group consisting of water-soluble proteins and protein-degradation products, drying the mixture, and swelling the dried product in cold water.

6. A method of preparing a firm, transparent, thermo-reversible gel, which comprises preparing a mixture consisting of an aqueous solution of a water-soluble polyvinyl alcohol and from about 1 to about 20%, based on the weight of the polyvinyl alcohol, of gelatin, drying the mixture, and swelling the dried product in cold water.

7. A method of preparing a firm, transparent, thermo-reversible gel, which comprises preparing a mixture consisting of an aqueous solution of a water-soluble polyvinyl alcohol and from about 1 to about 20%, based on the weight of the polyvinyl alcohol, of bone glue, drying the mixture, and swelling the dried product in cold water.

8. A method of preparing a firm, transparent, thermo-reversible gel, which comprises preparing a mixture consisting of an aqueous solution of a water-soluble polyvinyl alcohol and from about 1 to about 20%, based on the weight of the polyvinyl alcohol of glycine, drying the mixture, and swelling the dried product in cold water.

CARL E. BARNES.
WILLIAM O. NEY, JR.

REFERENCES CITED

The following references are of record in the file of this patent:

UNITED STATES PATENTS

| Number | Name | Date |
| --- | --- | --- |
| 2,138,751 | Vohrer | Nov. 29, 1938 |
| 2,184,310 | Meigs et al. | Dec. 26, 1939 |
| 2,184,311 | Meigs | Dec. 26, 1939 |
| 2,188,167 | Whitehead | Jan. 23, 1940 |
| 2,280,986 | Toland | Apr. 28, 1942 |
| 2,340,866 | Dangelmajer | Feb. 8, 19444 |
| 2,376,371 | Lowe et al. | May 22, 1945 |

FOREIGN PATENTS

| Number | Country | Date |
| --- | --- | --- |
| 393,505 | Great Britain | June 8, 1933 |
| 393,488 | Great Britain | June 8, 1933 |